United States Patent [19]

Mohri et al.

[11] 4,338,645
[45] Jul. 6, 1982

[54] TAPE RUNNING TIME INDICATION SYSTEM

[75] Inventors: Katsuo Mohri, Yokosuka; Yoshinori Okada, Katsuta, both of Japan

[73] Assignee: Hitachi, Ltd., Tokyo, Japan

[21] Appl. No.: 90,610

[22] Filed: Nov. 2, 1979

[30] Foreign Application Priority Data

Nov. 6, 1978 [JP] Japan .............................. 53-135849
Nov. 6, 1978 [JP] Japan .............................. 53-135853
Nov. 6, 1978 [JP] Japan .............................. 53-135854

[51] Int. Cl.$^3$ .............................................. G06F 15/20
[52] U.S. Cl. ................................. 360/137; 242/75.51; 242/75.52; 340/675
[58] Field of Search .................... 360/137, 72.3, 74.2; 340/675; 352/172, 170; 242/75.52, 75.51, 75.47, 191

[56] References Cited

U.S. PATENT DOCUMENTS

| 4,172,231 | 10/1979 | d'Alayer de Coglemore d'Arc | 360/137 |
| 4,217,615 | 8/1980 | Suzuki | 36/137 |
| 4,232,371 | 11/1980 | Kamoto | 242/75.51 |

*Primary Examiner*—Glen R. Swann, III
*Attorney, Agent, or Firm*—Craig and Antonelli

[57] ABSTRACT

In a video tape recorder or audio tape recorder, the remaining tape length indicated as time or taken-up tape length indicated as time is calculated by use of microcomputer and then accurately indicated as a time length by detecting the angular velocities of a supply reel and a take-up reel. A rotational period of time of each reel is detected twice, so that the tape running speed is calculated from the two detected values and the known tape caliper thickness, thus calculating and indicating the remaining tape length indicated as time and the taken-up tape length indicated as time. The remaining tape length and taken-up tape length indicated as time in such operation modes of a tape recorder as fast forward, and rewind, as well as recording and reproduction are accurately indicated.

8 Claims, 10 Drawing Figures

TAPE RUNNING TIME INDICATION SYSTEM

BACKGROUND OF THE INVENTION

The present invention relates to a system for indicating as time the taken-up length or remaining length of a tape recording medium in an apparatus using such a tape recording medium, and more particularly to a system for indicating as time the taken-up length or remaining length of the tape suitable for a magnetic recording-reproduction apparatus such as an audio tape recorder or a video tape recorder using a tape contained in a cartridge or a cassette.

In conventional magnetic recording-reproduction apparatuses such as a video tape recorder or an audio tape recorder, the length taken-up of the tape recording medium, i.e., the length thereof wound through the recorder, is indicated generally by use of a device called a tape counter. In this tape counter, the rotation of the reels is transmitted to a mechanical revolutions counter through a belt or the like, thus indicating the number of reel revolutions in three or four digits. Such a tape counter has problems as mentioned below.

(1) The taken-up tape length is indicated indirectly by the number of reel revolutions, and the rotational speed of the reels depends on the amount of tape which is unwound, thus making it impossible to indicate the taken-up tape length in terms of time.

(2) In the case where a reel partly wound with tape is loaded, it is impossible to detect the remaining tape length.

(3) It is impossible to search the tape for a point associated with a given point in time.

The conventional tape counter has the above-mentioned shortcomings and therefore the exact time length or point cannot be determined by the tape counter. The user must determine the amount of tape taken up visually by experience. As a result, it often happens that the remaining tape length is not sufficient to record the whole of the desired program or it is almost impossible to search for a desired point midway of the recorded part of the tape by one fast forward or one rewind mode of operation but the fast forward or the rewind mode of operation or reproduction must be repeated several times in order to find the desired point of the tape, resulting in the disadvantage of handling inconvenience.

SUMMARY OF THE INVENTION

An object of the present invention is to provide a tape running time indication system which can indicate the taken-up tape length or remaining tape length accurately as an indication of time, whereby a point associated with a given time point can be accurately located.

According to the present invention, there is provided a tape running time indication system comprising means for detecting the angular velocities of the supply reel and the take-up reel thereof, a microcomputer for calculating the taken-up tape length or remaining tape length on the basis of the detected angular velocities, and means for indicating such a taken-up tape length or remaining tape length. The taken-up tape length or remaining tape length is calculated from the angular velocities of the supply reel and the take-up reel as explained below.

First, the parameters are defined as below.

| | |
|---|---|
| Tape running speed | v |
| Angular velocity of supply reel | $\omega_1$ |
| Hub radius of supply reel | R |
| Overall radius of tape-wound on supply reel | $r_1$ |
| Tape wound area of supply reel | $S_1$ |
| Angular velocity of take-up reel | $\omega_2$ |
| Hub radius of take-up reel | R |
| Overall radius of tape-wound on take-up reel | $r_2$ |
| Tape wound area of take-up reel | $S_2$ |
| Wound area of total tape | $S_0$ |
| Tape length | L |
| Tape caliper thickness | D |
| Remaining tape length indicated as time | $T_1$ |
| Taken-up tape length indicated as time | $T_2$ |
| Total tape length indicated as time | $T_0$ |

These parameters have relations as mentioned below.

$$r_1\omega_1 = r_2\omega_2 = v \tag{1}$$

$$S_0 = S_1 + S_2 = DL \tag{2}$$

$$T_0 = T_1 + T_2 \tag{3}$$

$$S_1 = \pi(r_1^2 - R^2) \tag{4}$$

$$S_2 = \pi(r_2^2 - R^2) \tag{5}$$

Thus, the remaining tape length indicated as time $T_1$ and the taken-up tape length indicated as time $T_2$ are given as shown below from the equations (2) and (3) above.

$$T_1 = \frac{S_1}{S_0} T_0 \tag{6}$$

$$T_2 = \frac{S_2}{S_0} T_0 \tag{7}$$

From equations (4), (5) and (6), $$T_1 = \frac{S_1}{S_1 + S_2} T_0 \tag{8}$$

$$= \frac{\pi(r_1^2 - R^2)}{\pi(r_1^2 - R^2) + \pi(r_2^2 - R^2)} T_0$$

$$= \frac{r_1^2 - R^2}{r_1^2 + r_2^2 - 2R^2} T_0$$

Substituting equation (1) into equation (8), $$T_1 = \frac{\left(\frac{v}{\omega_1}\right)^2 - R^2}{\left(\frac{v}{\omega_1}\right)^2 + \left(\frac{v}{\omega_2}\right)^2 - 2R^2} T_0 \tag{9}$$

In similar fashion, from equations (4), (5), (7) and (1), $$T_2 = \frac{\left(\frac{v}{\omega_2}\right)^2 - R^2}{\left(\frac{v}{\omega_1}\right)^2 + \left(\frac{v}{\omega_2}\right)^2 - 2R^2} T_0 \tag{10}$$

It will thus be seen that according to the present invention, it is possible to determine and indicate the remaining tape length and the taken-up tape length as time $T_1$ and $T_2$, respectively by substituting the tape running speed v, the reel angular velocities $\omega_1$ and $\omega_2$, the reel hub radius R and the total tape length indicated as time $T_0$ into equation (9) or (10). Generally, the thickness of magnetic tape has a variation of about ±10%. Since neither equation (9) nor (10) contains the tape caliper thickness D, however, the remaining tape length or taken-up tape length indicated as time is detected accurately without being affected by the variation in tape caliper thickness D.

In equations (9) and (10), the reel hub radius R is generally strictly controlled in the process of manufacture and therefore the variation thereof is negligibly small, so that a fixed value may be provided for substitution in actual calculation. Also, the tape running speed v is controlled with high accuracy and therefore a fixed value thereof may be used in the case of the video tape recorder. In the case where the tape running speed is not considered to be constant, however, such a value may be determined by detecting the reel angular velocities $\omega_1$ and $\omega_2$ twice. Further, the total tape length indicated as time $T_0$ is fixed for each cassette tape and may be substituted as such. As an alternative, the reel angular velocities may be detected twice and the time interval of such detection is detected, thus making it possible to determine the total tape length indicated as time. By using this detected value, a calculation with high accuracy is made possible.

According to the present invention, the remaining tape length or taken-up tape length indicated as time is accurately indicated only by detecting the reel angular velocities accurately.

DESCRIPTION OF THE PREFERRED EMBODIMENTS

Figure 1:
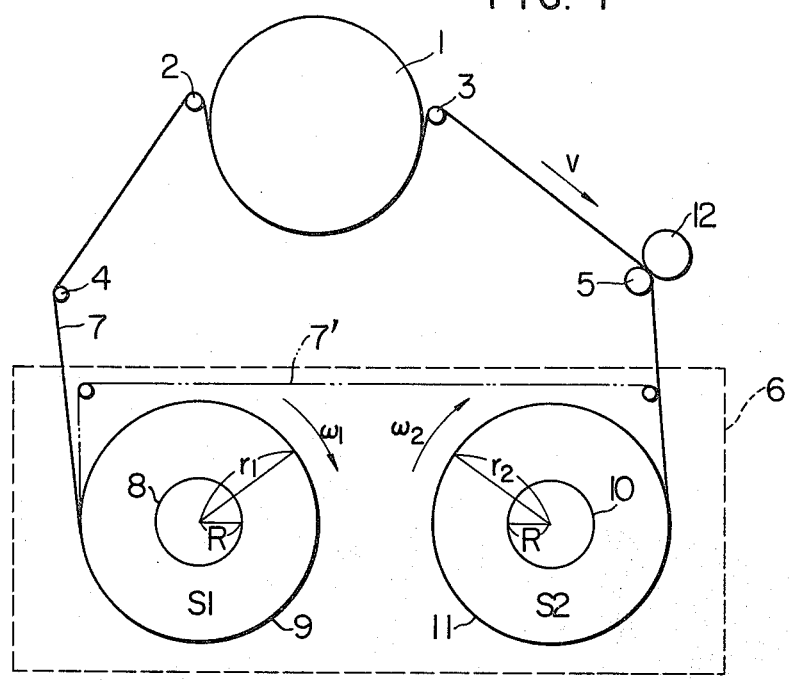
FIG. 1 is a plan view showing schematically a tape supply system of a video tape recorder to which the present invention is suitably applicable.

The tape running path for the video tape recorder using a cassette tape is schematically shown in FIG. 1. In this drawing, the tape 7 reeled out from a supply-side tape 9 wound on a supply reel 8 of a tape cassette 6 is fed through a tension arm 4 and a guide roller 2 and guided by being wound over an angle of 180 degrees around the cylinder 1 having rotary heads. Further, the tape is wound on a take-up reel 10 through a guide roller 3 and a capstan 5. In the process, the tape 7 is driven by the capstan 5 and a pinch roller 12 at a speed which is accurately maintained constant by the capstan generally. In a fast forward or a rewind mode, the tape 7 is driven directly between the supply reel 8 and the take-up reel 10 as shown by a dot-and-dash line 7'.

Some of the parameters used for the above-mentioned calculation are also shown in the drawing.

Figure 2:
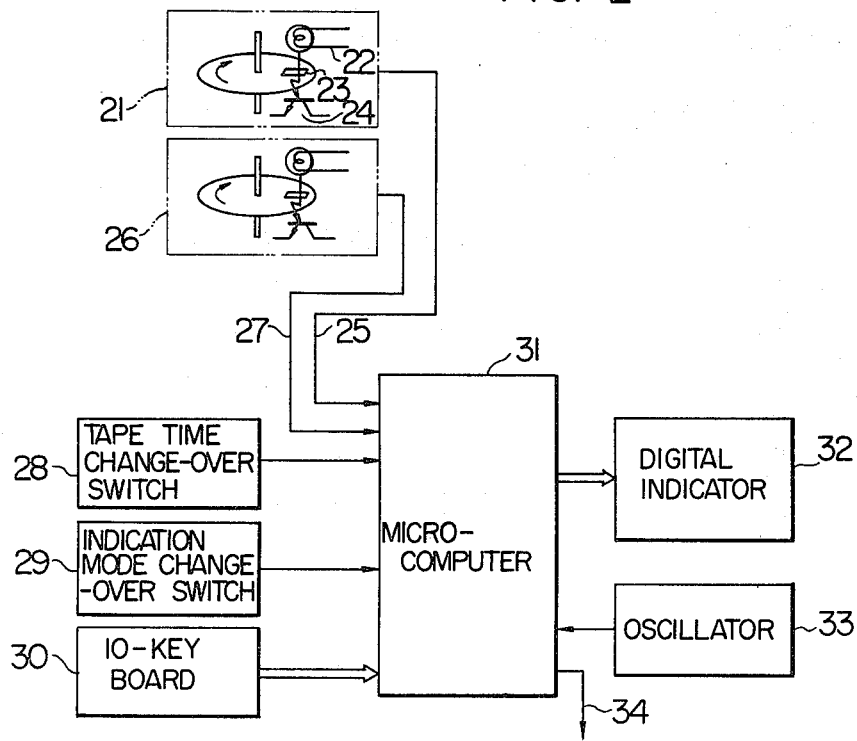
FIG. 2 is a block diagram showing an embodiment of the present invention.
Figure 3:
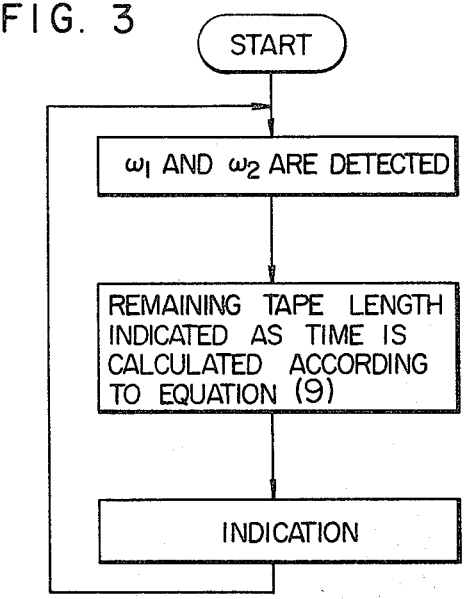
FIG. 3 is a flow chart for explaining the operation of the circuit of FIG. 2.

Specific means for calculating and indicating the remaining tape length by equation (9) as mentioned above is shown in FIG. 2, and a flow chart for explaining the operation thereof is shown in FIG. 3. In FIG. 2, reference numeral 21 designates an angular velocity detector for the supply reel 8. A disc having a slit 23 is connected to the rotary shaft of the supply reel 8 directly or through a belt or an idler. The light of the lamp 22 passed through the slit 23 is received by a photo-transistor 24, thus producing an angular velocity detection signal 25. An angular velocity detector 26 for the take-up reel 10 constructed in similar fashion produces an angular velocity detection signal 27 for the take-up reel 10. The angular velocity detection signals 25 and 27 are applied to a microcomputer 31. The microcomputer 31 is operated by a reference clock signal of stable frequency generated by an oscillator 33 using a crystal oscillator element. By counting the number of reference clock pulses applied during one revolution of the reels, the angular velocities $\omega_1$ and $\omega_2$ are detected respectively. The hub radius R of the supply and take-up reels and the total tape length indicated as time $T_0$ are known for the tape cassette used, and may be registered in the microcomputer 31 in advance. These values are processed as shown in the flow chart of FIG. 3, so that the remaining tape length indicated as time $T_1$ is calculated by equation (9) and indicated on the digital indicator 32.

Figure 4:
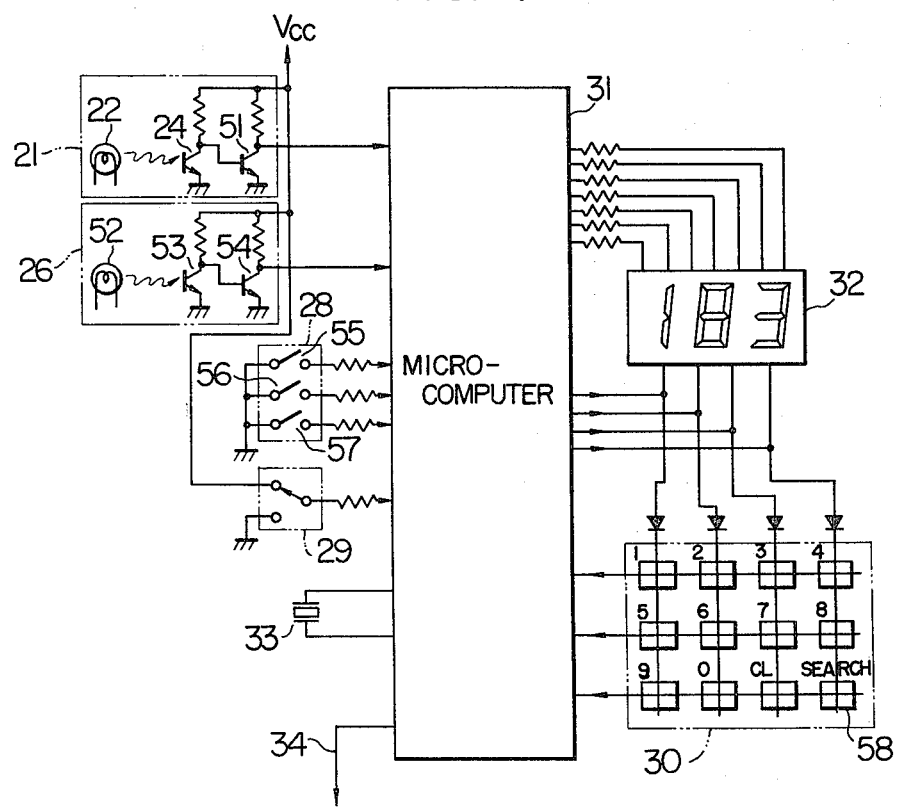
FIG. 4 is a circuit diagram showing a specific example of the peripheral circuit of the microcomputer included in the circuit of FIG. 2.

The peripheral parts of the microcomputer 31 of the embodiment shown in FIG. 2 are illustrated more in detail in the circuit diagram of FIG. 4. The flow chart for explaining the operation thereof is shown in FIG. 5.

Three types of cassette tapes of 120, 60 and 30 minutes are now available for the home video tape recorder, and each have different total tape lengths indicated as time $T_0$ and hub radii R. In mounting these tapes of different types, the type of tape is designated by the tape time change-over switch 28 comprising switches 55, 56 and 57. The user may confirm the remaining tape length indicated as time when using the video tape recorder in a recording mode, while he will in most cases be desirous of confirming the taken-up tape length indicated as time in a reproduction mode. The mode change-over switch 29 enables the remaining tape length indicated as time $T_1$ or the taken-up tape length indicated as time $T_2$ to be indicated selectively.

By use of the 10-key keypad 30, on the other hand, the tape address time is designated, so that when the taken-up tape length indicated as time $T_2$ coincides with the address time, a capstan stop signal 34 is generated thereby to stop the capstan, thus permitting a desired time point to be located.

Figure 5:
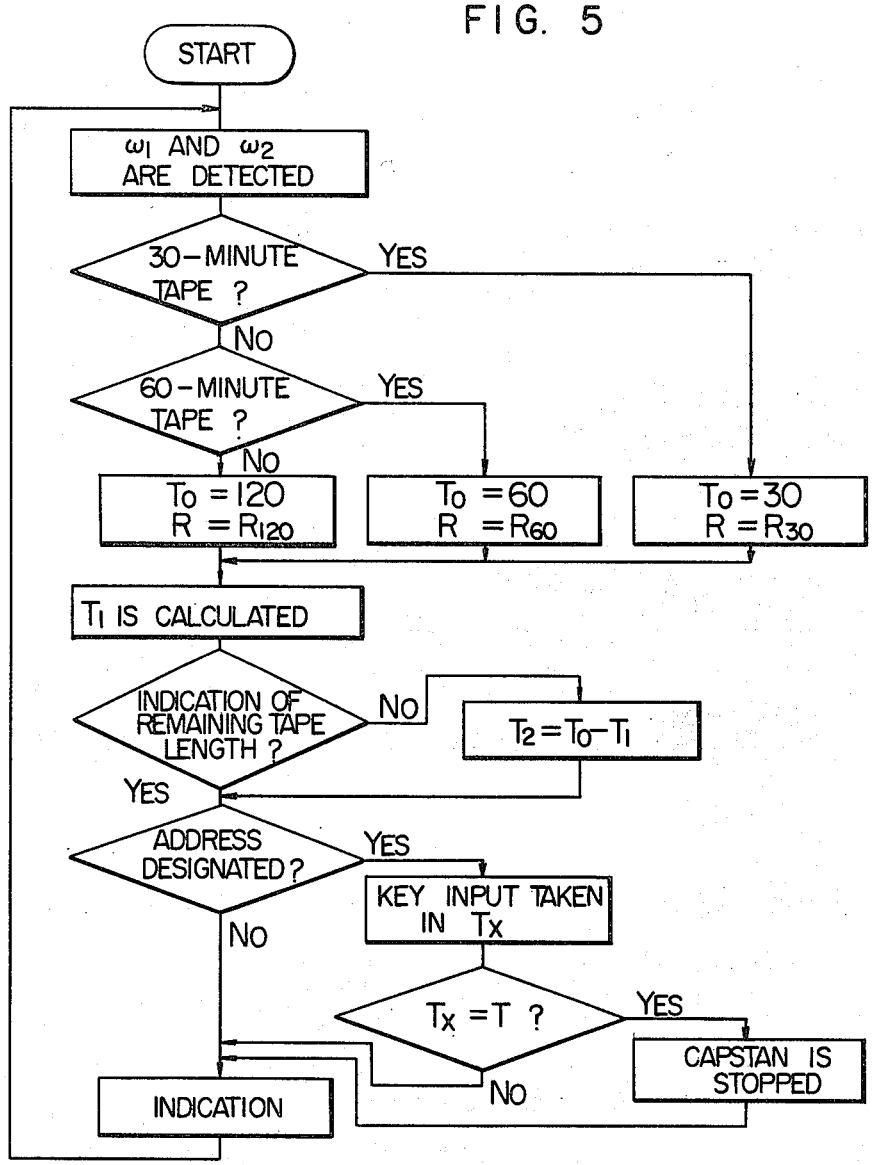
FIG. 5 is a flow chart for explaining the operation of the circuit of FIG. 4.

These operations are performed by the microcomputer 31 in accordance with the flow chart of FIG. 5. Specifically, the total tape length indicated as time of 30, 60 or 120 minutes is first confirmed, so that the total tape length indicated as time $T_0$ and the hub radius R are set at the corresponding values. These values and the signals of reel angular velocities $\omega_1$ and $\omega_2$ are used to calculate the remaining tape length indicated as time $T_1$. Further, it is decided whether a signal from the indication mode change-over switch 29 is the remaining tape length indicated as time $T_1$ or not, and if it is the remaining tape length indicated as time $T_1$, the taken-up tape length indicated as time $T_2$ is determined from $T_2 = T_0 - T_1$. If an address is designated by the 10-key keypad 30, the key input signal is taken in, and when the remaining tape length or taken-up tape length indicated as time coincides with the designated time T, the signal 34 is generated for stopping the capstan 5, thus stopping the tape supply. The mechanism for stopping the tape is not shown but is easily realized by the prior art. Also, the result of calculation according to the flow chart is indicated on the numeral indicator 32.

The above-mentioned embodiment is suitable for the video tape recorder. In the video tape recorder, the control signal recorded in the control track or, in the case of recording, the vertical synchronizing signal extracted from the video signal is used to control the rotation of the capstan. The tape speed is thus very stable and has little error. Without detecting such an error, therefore, a predetermined fixed value of tape speed may be used for accurate detection of the remaining tape length or taken-up length indicated as time.

In the case of an audio tape recorder, however, the tape speed involves a considerably large error. Also, even the video tape recorder develops a tape speed error in a mode other than recording or reproduction, such as fast forward or rewind where the tape speed is not regulated. Description will be made of a method for detecting the taken-up tape length or remaining tape length indicated as time accurately even in such a case.

According to another embodiment, the rotational period of time of the supply reel or the take-up reel is measured twice successively, so that the resulting measurements $\Delta t(n)$, $\Delta t(n+1)$ (n: Number of revolutions counted as from the winding start of the reels) and the tape caliper thickness D are used to determine the tape running speed from the relations mentioned below.

Assume that n revolutions of a tape have already been wound on the take-up reel. The period of time $\Delta tn$ and the n-th revolution is given below:

$$\Delta t(n) = \frac{2\pi(R + nD)}{v_n} \quad (11)$$

The period of time $\Delta tn + 1$ for the (n+1)th revolution is expressed as below:

$$\Delta t(n + 1) = \frac{2\pi R + (n + 1)D}{v_{n+1}} \quad (12)$$

The tape running speed $v_n$ at the n-th revolution is almost the same as the tape running speed $v_{n+1}$ at the (n+1)th revolution, and therefore, if they are expressed as v, then $$v_n = v_{n+1} = v \quad (13)$$

The equation (11) is substituted from equation (12), and equation (13) is substituted into the difference therebetween.

$$v = \frac{2\pi D}{\Delta t(n + 1) - \Delta t(n)} \quad (14)$$

Thus, by using the equation (14), the tape running speed is calculated from the measurements $\Delta t(n)$, $\Delta t(n+1)$ and the tape caliper thickness D. By substituting the resulting value into equation (9) or (10), the remaining tape length or taken-up tape length indicated as time is calculated with high accuracy respectively. In similar manner, the measurement of the period of time $\Delta t(n-1)$ at the (n-1)th revolution enables the remaining tape length or taken-up tape length indicated as time to be determined according to $$v = \frac{2\pi D}{\Delta t(n) - \Delta t(n - 1)}.$$

Also it is possible to determine the remaining tape length or taken-up tape length indicated as time from measurements on several revolutions apart from each other.

Figure 6:
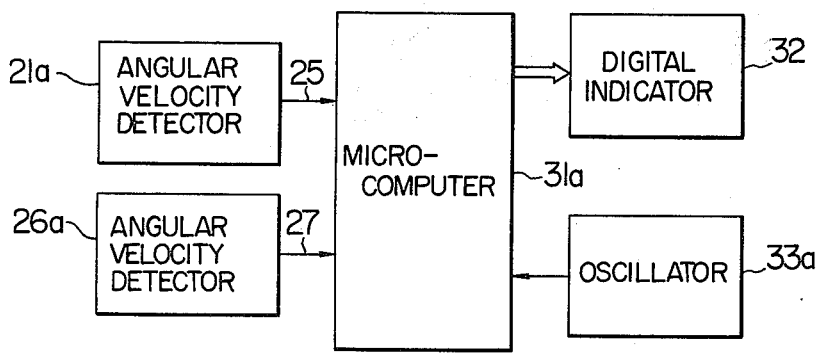
FIG. 6 is a block diagram showing another embodiment of the present invention.

Specific means for realizing the above-mentioned method will be explained with reference to FIGS. 6 and 7. FIG. 6 shows a block diagram showing a second embodiment of the present invention, and FIG. 7 a flow chart for explaining the operation of the microcomputer used in the embodiment of FIG. 6. Reference numeral 21a designates a detector of the angular velocity of the supply reel, which produces an angular velocity detection signal 25 for the supply reel. In similar fashion, the angular velocity detection signal 27 for the take-up reel is produced from the take-up reel angular velocity detector 26a. These reel angular velocity detection signals 25 and 27 are applied to the microcomputer 31a. The microcomputer 31a operates on the output of the highly stable oscillator 33a as a reference clock signal, and determines the angular velocities $\omega_1$ and $\omega_2$ by determining the number of the reference clock pulses applied thereto during one revolution of each reel. At the same time, the microcomputer 31a measures the values of $\Delta tn$ and $\Delta t(n+1)$ required for calculation of the tape running speed v. These values are processed according to the flow chart of FIG. 7, the remaining tape length indicated as time $T_1$ or taken-up tape length indicated as time $T_2$ is calculated by equation (9) or (10), and the resulting values are indicated as time length on the digital indicator 32.

Figure 7:
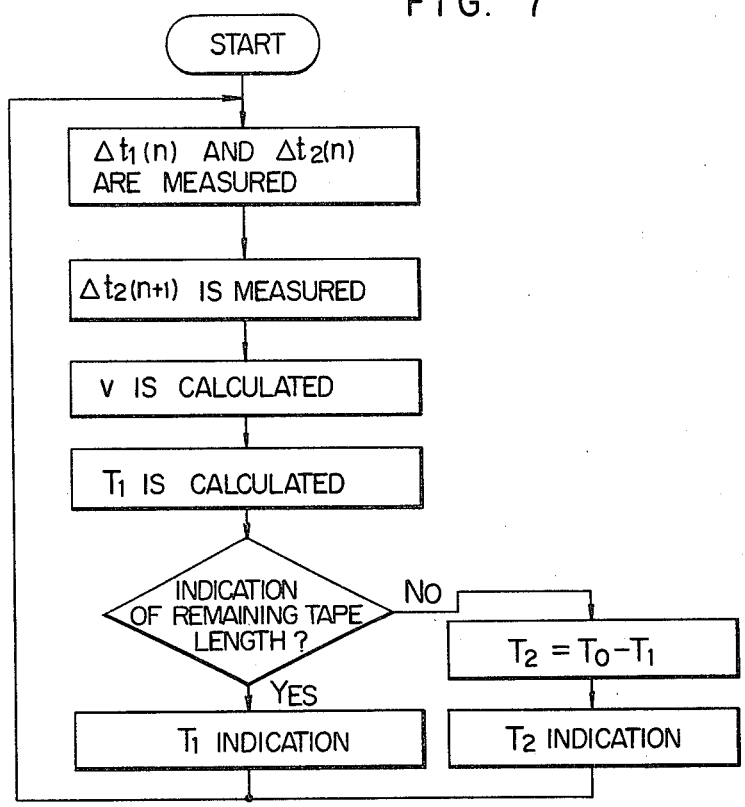
FIG. 7 is a flow chart for explaining the operation of the embodiment shown in FIG. 6.

In the flow chart of FIG. 7, the first step is to measure the rotational periods of time $\Delta t1(n)$ and $\Delta t2(n)$ of the supply reel 8 and the take-up reel 10, respectively. Further, the period of time $\Delta t2(n+1)$ of the next revolution of either the supply reel or the take-up reel, for instance, the take-up reel, is measured. Then, the tape running speed v is calculated from the equation (14) on the basis of the measurements $\Delta t2(n)$ and $\Delta t2(n+1)$ and the tape caliper thickness D. By use of the tape speed v and the measurements $\Delta t1(n)$ and $\Delta t2(n)$, the remaining tape length indicated as time $T_1$ is calculated from equation (9), thus selectively indicating the remaining tape length or taken-up tape length indicated as time. This routine is repeated.

Figure 8:
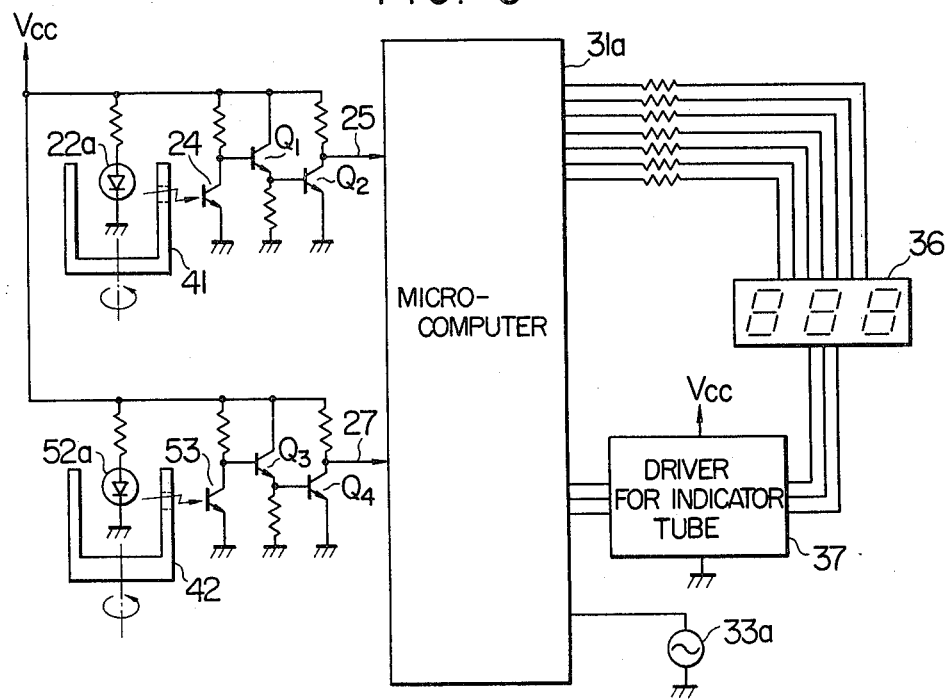
FIG. 8 is a circuit diagram showing a specific example of the peripheral circuit of the microcomputer included in the embodiment in FIG. 6.

The circuit of this embodiment will be explained below in more detail with reference to FIG. 8 showing the circuit of the embodiment of FIG. 6 in detail. The light from the light-emitting diode 22a is received by a phototransistor 24 through a slit formed in a rotary member 41 connected and adapted to rotate in relationship to the supply reel 8. This signal is applied through the transistors Q1 and Q2 so that the input voltage to the microcomputer 31a is raised to a high level upon receipt of the light and reduced to low level in the absence of light. Thus, an input voltage of high level is applied depending on the position of the slit. Since the microcomputer 31a has a reference clock signal from the oscillator 33a, the intervals of the high-level input are calculated by the microcomputer 31a, thus producing the angular velocity $\omega_1$ and the rotational period of time $\Delta t$ of the supply reel. In similar fashion, the light from the light-emitting diode 52a is applied to the photo-transistor 53 through a slit formed in the rotary member 42 connected and adapted to rotate in relationship with the take-up reel 10, thus producing the angular velocity $\omega_2$ and the rotational period of time $\Delta t$ of the take-up reel. In the microcomputer 31a, the remaining tape length or taken-up tape length indicated as time is calculated according to the flow chart of FIG. 7 by use of the angular velocities $\omega_1$ and $\omega_2$. The result of the calculation is applied to a digital numeral indicator tube 36 through a resistor on the one hand and the indicator tube 36 is driven by the indicator tube driver 37 on the other hand.

In the case where tapes of different caliper thicknesses are used in this embodiment, a switch is provided to select the desired one of the tapes, so that a predetermined value of tape caliper thickness is applied to the microcomputer 31a. As in the preceding embodiment, it is also of course possible to locate the tape position associated with the desired time length with the signal applied from a keyboard.

As mentioned above, in view of the fact that tape cassettes of different total tape time lengths, i.e., total tape lengths indicated as time including 30, 60 and 120 minutes are available and that many manufacturers produce these tapes, a considerably large error of the total tape length is permitted, probably resulting in a considerable variation in the total tape length indicated as time $T_0$. Therefore, the calculated remaining tape length or taken-up tape length indicated as time may be considerably affected by the variation in the total tape length indicated as time $T_0$. Description will be made of an embodiment which is capable of detecting the remaining tape length or taken-up tape length indicated as time with high accuracy without regard to the variation in total tape time $T_0$.

In this embodiment, the manner in which the total tape indicated as time $T_0$ is detected from the angular velocities of the reels will be explained below. The equations below are introduced from equations (1) to (5) above.

$$\frac{T_1}{T_0} = \frac{S_1}{S_0} = \frac{r_1^2 - R^2}{r_1^2 + r_2^2 - 2R^2} \tag{15}$$

$$= \frac{\left(\frac{v}{\omega_1}\right)^2 - R^2}{\left(\frac{v}{\omega_1}\right)^2 + \left(\frac{v}{\omega_2}\right)^2 - 2R^2} \equiv K_1$$

$$\frac{T_2}{T_0} = \frac{S_2}{S_0} = \frac{r_2^2 - R^2}{r_1^2 + r_2^2 - 2R^2} \tag{16}$$

$$= \frac{\left(\frac{v}{\omega_2}\right)^2 - R^2}{\left(\frac{v}{\omega_1}\right)^2 + \left(\frac{v}{\omega_2}\right)^2 - 2R^2} \equiv K_2$$

The values $K_1(t_1)$ or $K_2(t_1)$ at a time point $t_1$ and the values $K_1(t_2)$ or $K_2(t_2)$ at a time point $t_2$ which corresponds to a time point after a given passage of time $T'$ from the time point $t_1$ are calculated from equations (15) and (16), while at the same time measuring the time interval $T'$. Thus, the equations shown below are established.

$$T_1 = K_1(t_1) \times T_0 \tag{17}$$

$$T_1 - T' \times K_1(t_2) \times T_0 \tag{18}$$

or $$T_2 \times K_2(t_1) \times T_0 \tag{19}$$

$$T_2 + T' = K_2(t_2) \times K_0 \tag{20}$$

From equations (17) and (18) or (19) and (20), the equations below are obtained.

$$T_0 = \frac{T'}{K_1(t_1) - K_1(t_2)} = \frac{T'}{\Delta K_1} \tag{21}$$

$$T_0 = \frac{T'}{K_2(t_2) - K_2(t_1)} = \frac{T'}{\Delta K_2} \tag{22}$$

It will be seen that by detecting the angular velocity of each reel twice for a short period of time and measuring the time interval of such detections, the total tape length indicated as time $T_0$ is detected. As a result, even in the case of a tape having a length different from a predetermined length due to the variation in tape length, the remaining tape length or taken-up tape length indicated as time is measured and indicated with high accuracy by substituting the calculated total tape length indicated as time $T_0$ into equation (9) or (10).

Figure 9:
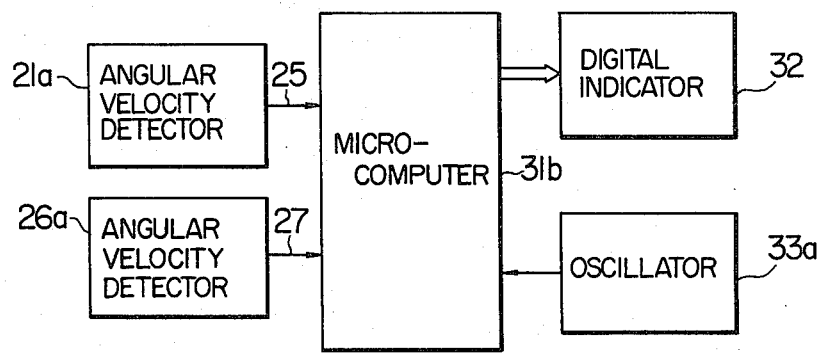
FIG. 9 is a block diagram showing a further embodiment of the present invention.
Figure 10:
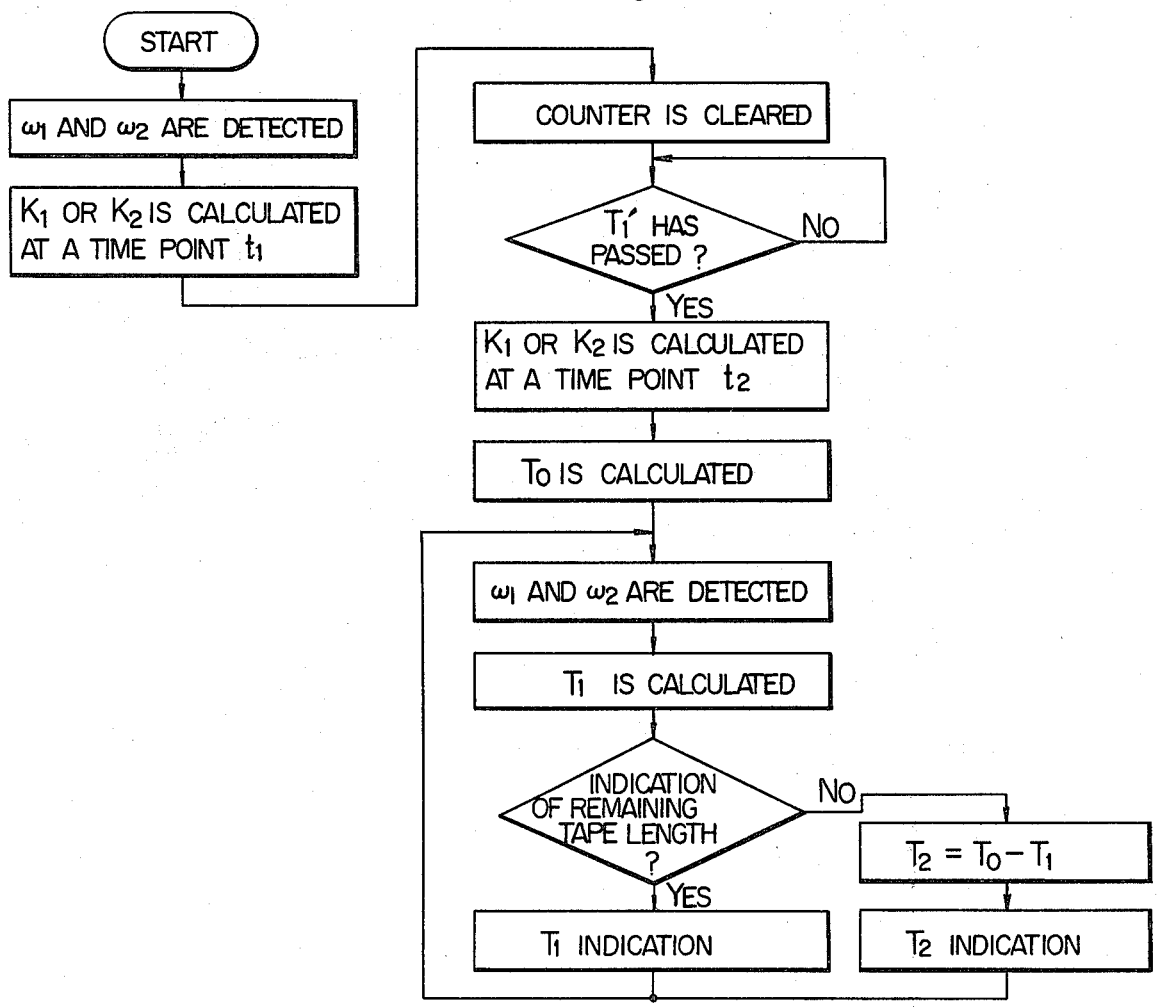
FIG. 10 is a flow chart for explaining the operation of the embodiment shown in FIG. 9.

Specific means for detecting and indicating the remaining tape length and taken-up length indicated as time in this way will be explained with reference to FIG. 9. A specific operation of such means is shown in the flow chart of FIG. 10.

Exactly the same circuit arrangement as shown in the embodiment of FIG. 8 may be used for the input-output peripheral circuit of the microcomputer 31b including the angular velocity detectors 21a and 26a for the supply and take-up reels, the oscillator 33a for generating a reference clock signal and a numeral indicator 32. The embodiment under consideration is different from the preceding embodiment in the processing operation of the microcomputer 31b which is performed according to the flow chart of FIG. 10 in the embodiment under consideration.

First, the value $K_1(t_1)$ and $K_2(t_1)$ at a time point $t_1$ are obtained from the result of detection of the reel angular velocities $\omega_1$ and $\omega_2$. Then the value $K_1(t_2)$ or $K_2(t_2)$ at a time point $t_2$ which corresponds to a time point after a given passage of time $T'$ from the time point $t_1$ is obtained, so that the value $T_0$ is calculated from equation (21) or (22). After calculation of $T_0$, the angular velocities $\omega_1$ and $\omega_2$ for the respective reels are detected. The remaining tape length indicated as time $T_1$ is calculated from equation (9), so that the remaining tape length or taken-up tape length indicated as time is selected and indicated. This routine is repeated.

As mentioned above, the same circuit arrangement as that of FIG. 8 may be used as a specific peripheral circuit for the microcomputer 31b for this embodiment. For instance, a slit is formed in a rotary member 41 adapted to rotate in association with the supply reel, and the light from a light-emitting diode 22a that has passed through this slit is applied to the photo-transistor 24. Through the transistors Q1 and Q2, a high-level potential is applied to the microcomputer 31b upon receipt of the light, while a low-level potential is applied thereto in the absence of light. If the rotary member 41 is constructed to make one revolution in synchronism with one revolution of the reel, therefore, a high-level signal 25 is applied to the microcomputer 31b for each reel revolution. In similar fashion, a signal 27 corresponding to the rotation of the take-up reel 10 is applied to the microcomputer 31b by the rotary member 42 having a slit rotatable in association with the take-up reel 10, a light-emitting diode 52a and a photo-transistor 53. It is obvious that the rotary members 41 and 42 are not necessarily required to have the same angular velocity as the reels but if they are constructed to have a fixed rotational relation with each other, the angular velocities are easily obtained from the microcomputer. Further, several slits instead of one slit may be formed in the rotary members 41 and 42 without affecting the detection of the rotational periods of time or angular velocities.

It is already explained that the microcomputer 31b is operated by the reference clock signal of stable frequency generated from oscillator 33a using a crystal oscillator element or the like. Therefore, the angular velocities can be detected by counting the clock pulses to determine the intervals of the high-level signal applied in accordance with the rotation of the rotary members 41 and 42. Further, the time interval between the first detection of the angular velocity and the next detection thereof is detected accurately by use of the clock signal. The total tape length indicated as time $T_0$ is accurately determined from the reel angular velocities $\omega_1$ and $\omega_2$ detected twice as above and the time interval T'. Also, from the values $\omega_1$ and $\omega_2$, the remaining tape length or taken-up tape length indicated as time is determined, and the result of calculation is displayed on the numeral indicator tube 36.

In this embodiment, as in the preceding embodiment, the tape running speed v may alternatively be determined by calculation in the microcomputer 31b on the basis of the result of the two detections of the reel angular velocity, or as in the embodiment first-above described, one of a plurality of predetermined fixed tape speeds may be selectively applied to the microcomputer 31b. Furthermore, it is possible to locate a given address easily be designating the desired time point with a keyboard.

We claim:

1. A tape running time indication system for a magnetic recording-reproduction apparatus using a magnetic tape and including a supply reel and a take-up reel, comprising:
   means for detecting an angular velocity $\omega_1$ of said supply reel;
   means for detecting an angular velocity $\omega_2$ of said take-up reel;
   a microcomputer supplied with the velocities $\omega_1$ and $\omega_2$ detected by said detecting means, the tape running speed v, the total tape length indicated as time $T_0$ corresponding to the total tape length and the hub radius R of each reel, said microcomputer calculating at least one of a remaining tape length $T_1$ indicated as time and a taken-up tape length $T_2$ indicated as time; and
   means for indicating a length of time obtained from the result of said calculation.

2. A tape running time indication system according to claim 1, wherein said microcomputer comprises means for calculating the remaining tape length $T_1$ indicated as time in accordance with an equation of $$T_1 = \frac{\left(\frac{v}{\omega_1}\right)^2 - R^2}{\left(\frac{v}{\omega_1}\right)^2 + \left(\frac{v}{\omega_2}\right)^2 - 2R^2} T_0.$$

3. A tape running time indication system according to claim 1, wherein said microcomputer comprises means for calculating the taken-up tape length $T_2$ indicated as time in accordance with an equation of $$T_2 = \frac{\left(\frac{v}{\omega_2}\right)^2 - R^2}{\left(\frac{v}{\omega_1}\right)^2 + \left(\frac{v}{\omega_2}\right)^2 - 2R^2} T_0.$$

4. A tape running time indication system according to claim 1, 2 or 3, further comprising means for detecting a rotational period of time $\Delta t(n)$ and a rotation period of time $\Delta t(n+1)$ for the n-th revolution and the (n+1)th revolution respectively from the start of winding on a selected one of said supply and take-up reels, said microcomputer calculating the value v as shown below from the tape caliper thickness D applied to the microcomputer in advance and the rotational periods of time $\Delta t(n)$ and $\Delta t(n+1)$ detected as above, the calculated tape running speed v being used for calculation of the remaining tape length $T_1$ and taken-up tape length $T_2$ indicated as time $$v = \frac{2\pi D}{\Delta t(n+1) - \Delta t(n)}.$$

5. A tape running time indication system according to claim 1, 2 or 3, further comprising means for selecting the value of the tape running speed v from a plurality of predetermined values in accordance with the operation mode of the magnetic recording-reproduction apparatus, said means applying said selected value to said microcomputer.

6. A tape running time indication system according to claim 1, 2 or 3, wherein said microcomputer comprises means for calculating a selected one of the changes $\Delta K_1$ and $\Delta K_2$ of the values $K_1$ and $K_2$ respectively thereby to determine the total tape length indicated as time $T_0$ in accordance with the equations shown below by use of the two detected angular velocities $\omega_1$ and $\omega_2$ of said supply reel and said take-up reel respectively and a time interval T' between said two detection time points, $$K_1 = \frac{\left(\frac{v}{\omega_1}\right)^2 - R^2}{\left(\frac{v}{\omega_1}\right)^2 + \left(\frac{v}{\omega_2}\right)^2 - 2R^2}$$

-continued $$K_2 = \frac{\left(\frac{v}{\omega_2}\right)^2 - R^2}{\left(\frac{v}{\omega_1}\right)^2 + \left(\frac{v}{\omega_2}\right)^2 - 2R^2}$$

$$T_0 = \frac{T}{\Delta K_1}, \quad T_0 = \frac{T}{\Delta K_2}.$$

the calculated value $T_0$ being used for calculation of the remaining tape length $T_1$ indicated as time and the taken-up tape length $T_2$ indicated as time.

7. A tape running time indication system according to claim 1, 2 or 3, further comprising means for selecting the value of total tape length indicated as time $T_0$ corresponding to the total tape length according to the tape used, said value $T_0$ being applied to said microcomputer.

8. A tape running time indication system according to claim 1, 2 or 3, further comprising means for applying a selected one of said remaining tape length indicated as time and taken-up tape length indicated as time to said microcomputer for storage therein, and means for generating a signal for stopping the capstan of the magnetic recording-reproduction apparatus when the time calculated from the reel angular velocity by said microcomputer coincides with said stored time.

* * * * *